United States Patent
Coghlan

(10) Patent No.: US 8,361,584 B2
(45) Date of Patent: Jan. 29, 2013

(54) BELT SEAMS

(75) Inventor: Stephen Mark Coghlan, Auburn, NY (US)

(73) Assignee: Madison Filter 981 Ltd., Industrial Estate, Haslingden, Lancashire (GB)

( * ) Notice: Subject to any disclaimer, the term of this patent is extended or adjusted under 35 U.S.C. 154(b) by 326 days.

(21) Appl. No.: 12/810,040

(22) PCT Filed: Jan. 13, 2009

(86) PCT No.: PCT/GB2009/000081
§ 371 (c)(1),
(2), (4) Date: Aug. 9, 2010

(87) PCT Pub. No.: WO2009/093001
PCT Pub. Date: Jul. 30, 2009

(65) Prior Publication Data
US 2010/0297386 A1  Nov. 25, 2010

Related U.S. Application Data

(60) Provisional application No. 61/022,507, filed on Jan. 21, 2008.

(51) Int. Cl.
*F16G 3/04* (2006.01)

(52) U.S. Cl. .................. 428/58; 139/383 AA; 162/904
(58) Field of Classification Search .................. 428/58; 139/383 AA; 162/904; 24/33 P; 198/844.2; 474/256, 255
See application file for complete search history.

(56) References Cited

U.S. PATENT DOCUMENTS 4,746,339 A  5/1988  Millard

FOREIGN PATENT DOCUMENTS

| CH | 557192 A | 12/1974 |
|---|---|---|
| GB | 1266883 A | 3/1972 |
| GB | 2294468 A | 5/1996 |
| WO | 2005051518 A | 6/2005 |

*Primary Examiner* — Alexander Thomas
(74) *Attorney, Agent, or Firm* — Barlow, Josephs & Holmes, Ltd.

(57) ABSTRACT

A clipper seam for joining the ends of a belt, are connected by interdigitated staples which are looped about a pintle and provide barbs on their remote ends to penetrate into the material of the belt. Each end is covered by an edge strip of vinyl by radio frequency welding, and a flap is attached to one end on the low pressure side of the belt by a portion, and folded over to cover the seam on the low pressure side by means of a flap which extends beyond the seam area of the other end. A central area to each side of the seam is impregnated with polyurethane to resist abrasion which tends to concentrate in this area.

16 Claims, 2 Drawing Sheets

BELT SEAMS

This invention relates to improvements in belt seams, and in particular to clipper seams used to join the ends of filters and other belts.

Clipper seams are used in the paper machine and belt filtration arts to secure the ends of a filtration fabric to form an endless belt, especially for joining and unjoining the fabric on the machine for relative ease of installation, or removal for renovation or replacement. In a clipper seam, the ends of the fabric are each connected to a pintle wire or binding member by means of staples which are looped about the pintle wire and the ends of which comprise barbs which penetrate the fabric to be firmly connected with the fabric. The staples also each comprise a loop part which passes about the pintle, and the staples in each end may be looped about the pintle in an alternating interdigitated pattern such as strict alternation, or in groups of 2, 3 or more. The pintle or binding member, sometimes also referred to as a hinge wire, may comprise a single relatively thick rod or yarn of a synthetic material such as a polyamide, or a bundle of thinner fibres, or a twisted multifilament yarn.

Driven by the need of the papermaking industry to reduce or if possible eliminate marking of the paper product by the fabrics used in its production, it has become customary to cover the seam with a flap. In the filtration field, this has been generally followed as a flap on the 'cake' side helps to prevent catching of a blade used to help remove accumulated filter cake from the belt upon the seam, and to prevent solids or grit from passing through the seams.

A simple clipper seam is shown in GB 1,040,694 and a clipper seam covered by a flap is shown in GB 997354. These are examples only of a large number of disclosures of similar seams.

With belt filters typically working in the past at over-pressures of about 30 KPa, the wear to the belt occurring due to abrasion by leakage of solids through the seam was such as to allow a belt life of several months up to a year, in line with the belt life limitations caused by other factors. However, more recently it has become customary to employ much higher over-pressures in the order of 50-60 KPa. This imparts a much higher energy to solids particles, and abrasion damage to the belt occurs at a much faster rate, reducing belt life to a few weeks, significantly shorter than the limits to belt life due to other factors and seriously affecting the economics of the filtration operation because of the increased frequency and cost of belt replacement.

At 30 KPa of vacuum, no problems of premature seam wear were noticed, although they probably occurred to a lesser extent, and belts normally lasted a year, say 8000 hours of working life. When working at 50-60 KPa of vacuum however, such belts were wearing out in just a few weeks or even a few days. Inspection of the damage showed that holes were developing beginning from the low-pressure (down stream) side and under magnification, abrasion was seen to be from right to left on the leading edge, and left to right on the trailing edge. It was thus deduced that the high suction was creating a cyclone effect below the centre of the belt.

The old method of using a sewn cloth and/or Velcro™ sealed flap was bulky and caused difficultly in passing about small diameter (e.g. 20 cm) rolls, and would flex the Velcro open. Most suppliers would not trouble to supply flapped seams as they were often ineffective. Users would seal the seam with a silicone sealant, but the silicone would often be drawn through the flap by suction requiring frequent recoating and possibly contaminating the product.

In addition if a doctor blade was used to aid cake discharge, a bulky sewn and Velcroed flap is at considerable risk of being caught by the doctor blade.

It is an object of the invention to provide a seam construction in a filter belt which will be effective in reducing wear due to leakage of solids particles through the seam.

Preferably the seam construction will be adaptable to other types of pintle seams as well as to clipper seams.

The invention accordingly provides a belt having a seam for connecting the ends of the belt to form an endless belt by means of loops which extend from each end of the belt and pass about a common binder member, characterised in that a portion of a cover strip is secured to the edge region of one end of the belt and a further portion of the cover strip is folded back to extend over the seam and is secured by adhesion to the edge region of the other end of the belt and the loops of the one end of the belt pass through the first portion of the cover strip.

The edges of each end of the belt may be each further covered by a respective edge strip which is folded about the respective edge of the belt and the loops of the respective ends of the belt also pass through these edge strips.

The loops which connect the respective edges of the belt ends by means of the binder member are preferably staples in a clipper seam, and the staples have barbs which penetrate through the respective cover strip and edge strips into the material of the respective end region of each end of the belt.

The binder element may be a single rod or yarn of metal or of a synthetic material such as polyamide, polyester, PET etc, or may comprise a bundle of a number say three or four, strands of thinner yarns or rods of similar materials, or a twisted or untwisted multifilament yarn, or even an intumescent, or any of the kinds of binder element used in seaming filter or papermachine belts.

In a preferred additional feature, the low pressure side face may be treated in an area adjacent and to each side of the seam and centred on the longitudinal centre line of the belt, with a coating and/or impregnation of a wear resistant material, such as polyurethane to resist abrasion of the central part of the belt to either side of the seam, which is most susceptible to abrasion by particles which still pass through the seam.

BRIEF DESCRIPTION OF THE DRAWINGS

A preferred embodiment of filter belt and seam structure will now be described by way of example, with reference to the accompanying drawings, wherein.

Figure 1:
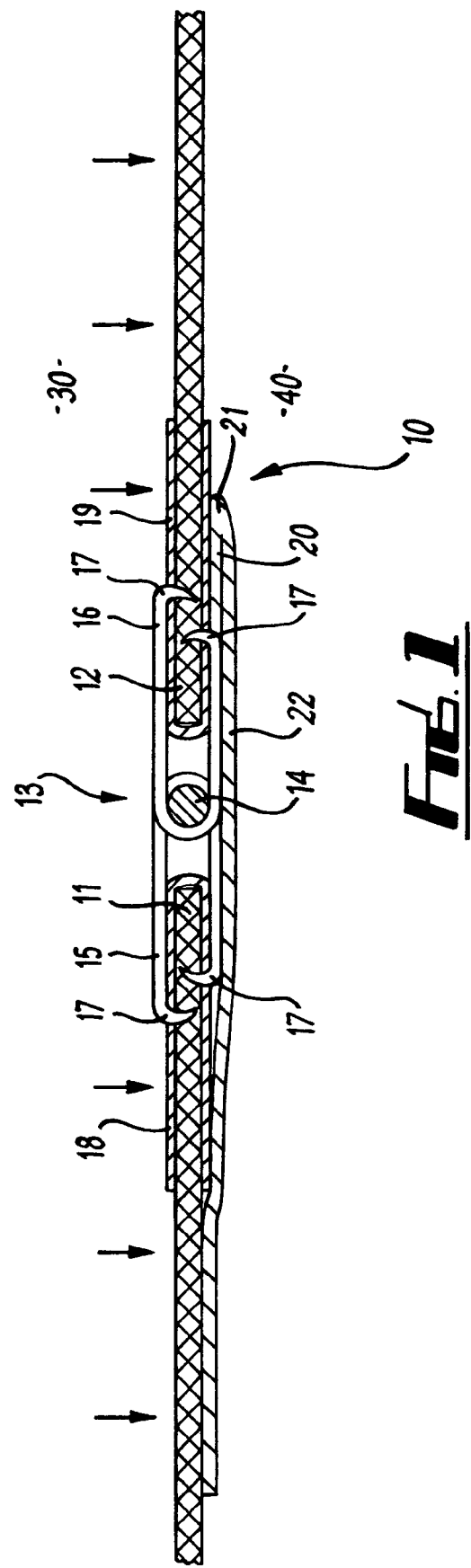
FIG. 1 is a sectional view of a seam structure in accordance with the invention, embodied as a clipper seam.
Figure 2:
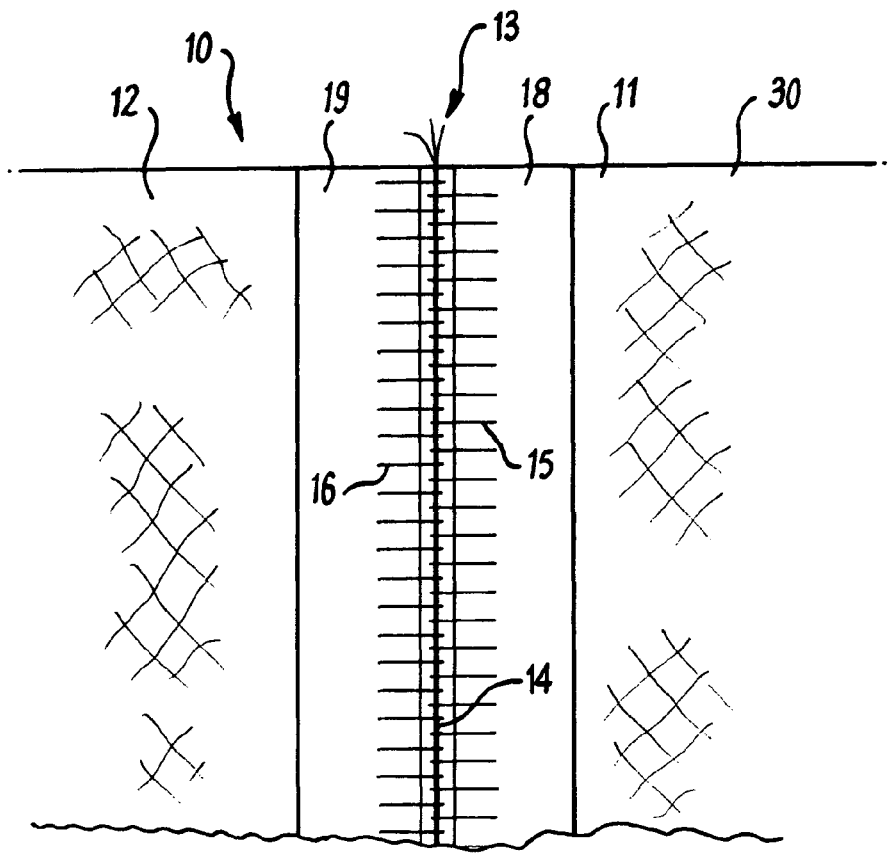
FIG. 2 is a plan view of a small part of a filter belt incorporating the seam structure of FIG. 1 in the seam region, from the high pressure or "cake" side of the belt.
Figure 3:
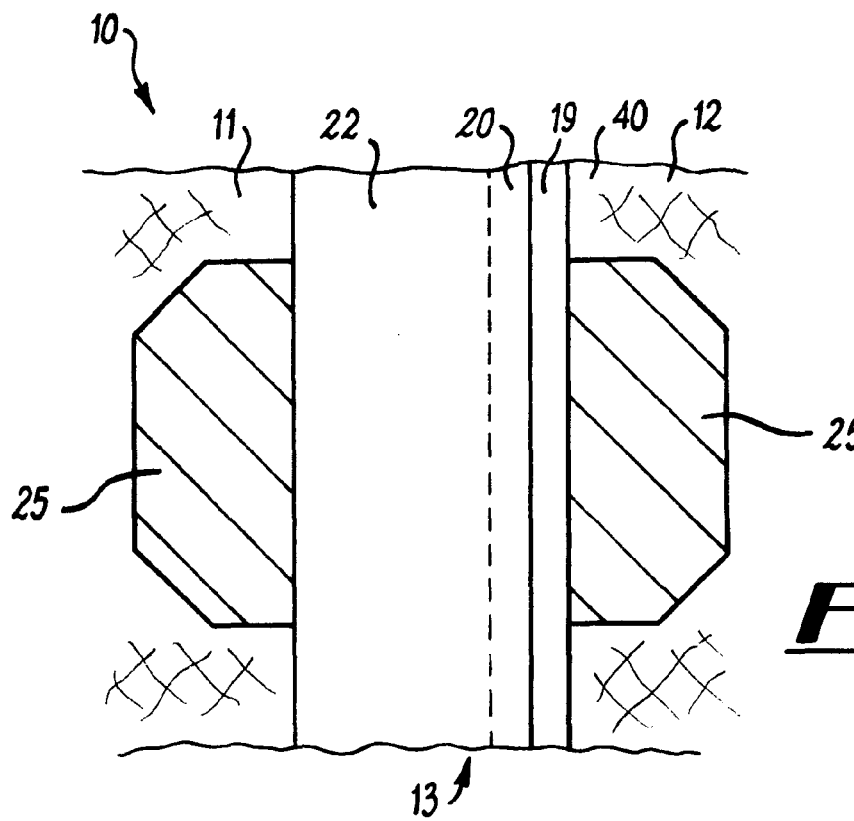
FIG. 3 is a plan view of a central part of the filter belt of FIG. 2, on the seam region, from the low pressure side of the belt.

A belt 10 comprises filter belt having a leading end 11 and a trailing end 12, which are jointed by a seam structure 13 to form an endless belt on a belt filter.

The seam structure is embodied as a clipper seam, and includes a binding member or pintle 14 in the form of a metal rod, and a large number of staples 15 on the leading end 11, and 16 on the trailing end 12, which are interdigitated to pass alternately around the pintle 14 forming a tunnel through which the pintle 14 is threaded, and then prevents the ends of the belt from being pulled apart by taking up the tension which acts upon it through the staples.

The staples 15, 16 each comprise a generally U-shaped member which loops about the pintle 14, and which is provided on the ends of its limbs with barbs 17 which are driven into the fabric of the belt 10, to hold the staples in place under the tractive load imposed by the tension on the belt, exerted by the pintle 14.

Before seaming, each end 11, 12 of the belt is prepared by radio frequency welding a respective strip 18, 19 of marine vinyl about the edge of the end, and overlapping some distance over each face of the belt away from the edge. A flap 20 is then attached to the belt on one side overlying the leading end 12 of the belt, and then the clipper seam is formed and the staples 15, 16 closed, passing through the vinyl strips 18, 19 and the flap 20 so that the barbs 17 penetrate into the filter cloth.

The main part of the flap 20 is then folded backwards over the seam and the fold 21 thus formed pressed with a hot flat iron to leave a working flap 22 over the seam.

The belt has a high pressure side 30, and a low pressure side 40. The dirty fluid (liquid or air or other gas) is fed to the high pressure side 30, typically under a pressure of 50-60 KPa. The gas or liquid passes through the filter leaves entrained solids, such as dust or slurry, on the high-pressure side face of the belt. This forms a filter "cake" which may be removed by means of a 'doctor" blade at each revolution of the belt, or by scraping off at intervals, or subjecting the belt occasionally to reverse air flow. The exact method may depend upon whether the "cake" of recovered solids, or the clean gas or liquid is the valuable product.

The flap 20,22 is provided on the low pressure side 40 of the filter belt. The central area of the ends of the belt adjacent the seam 13 is also treated by coating and/or partial impregnation of an area 25 with polyurethane to each side of the seam 13, centred on the longitudinal centre line of the belt 10. This serves to protect against wear and abrasion by any particles which pass through the seam 13 despite the presence of the flap 22 or if the latter should become displaced or damaged.

The area 25 is shown as being octagonal, but this may be of any desired shape and size. In many cases the area may be elliptical, depending on wear patterns which occur with particular machines.

The invention claimed is:

1. A belt, having a seam for connecting the ends of the belt to form an endless belt, by means of loops which extend from each end of the belt, and pass about a common binder member characterised in that a portion of a cover strip is secured to an edge region of one end of the belt, and a further portion of the cover strip is folded back to extend over the seam and is secured by adhesion to an edge region of the other end of the belt, and the loops of the one end of the belt pass through the first portion of the cover strip.

2. A belt according to claim 1, characterised in that the edges of each end of the belt are further covered by a respective edge strip which is folded about the respective edge of the belt, and the loops of the respective ends of the belt also pass through these edge strips.

3. A belt according to claim 2, characterised in that the strips comprise strips of marine vinyl which are radio frequency welded to the respective ends of the belt.

4. A belt, according to claim 1, characterised in that the loops which connect the respective edges of the belt ends by means of the binder member are staples in a clipper seam, and the staples each have barbs which penetrate through the respective cover strip and edge strips into the end material of the respective end region of each end of the belt.

5. A belt according to claim 1 characterised in that a low pressure side face of the belt is treated in an area adjacent and to each side of the seam and centered on the longitudinal centre line of the belt, with a coating and/or impregnation of a wear resistant material to resist abrasion of the central part of the belt to either side of the seam.

6. A belt according to claim 5, comprising a filter belt characterised in that the flap is attached to the belt on the low pressure face of the belt.

7. A belt, according to claim 1, characterised in that the binder element comprises a single rod of metal or of a synthetic material.

8. A belt, according to claim 7, wherein the synthetic material is selected from the group consisting of polyurethane, polyester, and PET.

9. A belt, according to claim 1, characterised in that the binder element comprises a single yarn of metal or of a synthetic material.

10. A belt, according to claim 9, wherein the synthetic material is selected from the group consisting of polyurethane, polyester, and PET.

11. A belt, according to claim 1, characterised in that the binder element comprises a bundle of a plurality of rods of metal or of a synthetic material.

12. A belt, according to claim 11, wherein the synthetic material is selected from the group consisting of polyurethane, polyester, and PET.

13. A belt, according to claim 1, characterised in that the binder element comprises a bundle of a plurality of strands of thinner yarns of metal or of a synthetic material.

14. A belt, according to claim 13, wherein the synthetic material is selected from the group consisting of polyurethane, polyester, and PET.

15. A belt, according to claim 13, wherein the yarns are either twisted or untwisted yarn.

16. A belt, according to claim 1, wherein the binder element comprises an intumescent.

\* \* \* \* \*